Nov. 21, 1967 E. H. LAND 3,353,464
PHOTOGRAPHIC FLASH APPARATUS AND METHOD
Original Filed Dec. 24, 1964 3 Sheets-Sheet 1

INVENTOR.
Edwin H. Land
BY Brown and Mikulka
and
Robert E. Corb
ATTORNEYS

Nov. 21, 1967    E. H. LAND    3,353,464
PHOTOGRAPHIC FLASH APPARATUS AND METHOD
Original Filed Dec. 24, 1964    3 Sheets-Sheet 2

INVENTOR.
Edwin H. Land
BY Brown and Mikulka
and
Robert E. Corb
ATTORNEYS

Nov. 21, 1967   E. H. LAND   3,353,464
PHOTOGRAPHIC FLASH APPARATUS AND METHOD
Original Filed Dec. 24, 1964   3 Sheets-Sheet 3

INVENTOR.
Edwin H. Land
BY Brown and Mikulka
and
Robert E. Corb
ATTORNEYS

United States Patent Office 3,353,464
Patented Nov. 21, 1967

3,353,464
PHOTOGRAPHIC FLASH APPARATUS
AND METHOD
Edwin H. Land, Cambridge, Mass., assignor to Polaroid Corporation, Cambridge, Mass., a corporation of Delaware
Continuation of application Ser. No. 420,984, Dec. 24, 1964. This application Mar. 6, 1967, Ser. No. 621,069
13 Claims. (Cl. 95—11)

This application is a continuation of copending application of Edwin H. Land, Ser. No. 420,984, filed Dec. 24, 1964, now abandoned.

This invention relates to photographic apparatus for and methods of exposing a photosensitive image-recording material to light from a subject illuminated by a photographic flash lamp and more particularly, to apparatus and methods employed in conjunction with exposure control devices of the type which normally determine the exposure interval automatically in response to exposure to light from the subject.

In the copending U.S. patent application of David S. Grey, Ser. No. 150,228, filed Nov. 6, 1961, there is described an automatic exposure control device adapted for incorporation in a camera shutter for making exposures of a duration dependent upon the rate of change (e.g., charge rate) of a charge on a capacitor. The device includes a photo-responsive resistor normally illuminated by light from the subject being photographed for controlling the rate of change of the charge and electrical contacts for closing a flash circuit at the beginning of each exposure. A typical shutter of this type is shown and described in the copending U.S. patent application of Richard R. Wareham, Ser. No. 268,998, filed Mar. 29, 1963, and is incorporated, for example, in cameras sold by Polaroid Corporation under the designation "Model 100" and "Model 101." These shutters include a blade for initiating an exposure and a second blade for terminating an exposure when the charge on a capacitor charged or discharged through a photoresponsive resistor reaches a predetermined level. Such a shutter is capable of initiating an exposure, completing a flash circuit at the commencement of exposure, measuring light from a subject illuminated by a photoflash and terminating exposure at the proper time and normally functions in this manner. However, it is frequently desirable under certain conditions to make so-called "open flash" exposures in which the shutter is opened, the flash lamp is fired and the shutter is closed at the end of the flash or light pulse from the lamp; or stated differently, in open flash photography, the exposure interval is determined primarily by the flash lamp rather than by the shutter.

Objects of the invention are: to provide photographic flash apparatus for making open flash exposures with a shutter mechanism including a photoresponsive resistor normally illuminated by light from the subject being photographed for controlling the rate of change of a charge on a capacitor, means for making exposures of a duration dependent upon the rate of change of the charge and electrical contacts for closing an electric circuit at the beginning of exposure; and to provide a method of open flash photography with a shutter mechanism of the type described.

Another object of the invention is to provide photographic flash apparatus for and methods of shielding the photoresponsive resistor of a shutter from illumination by light from the subject and predeterminedly illuminating the photoresponsive resistor to terminate exposures at the end of a predetermined interval commencing with flash lamp ignition.

Other objects of the invention will in part be obvious and will in part appear hereinafter.

The invention accordingly comprises the apparatus possessing the construction, combination of elements and arrangement of parts and the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
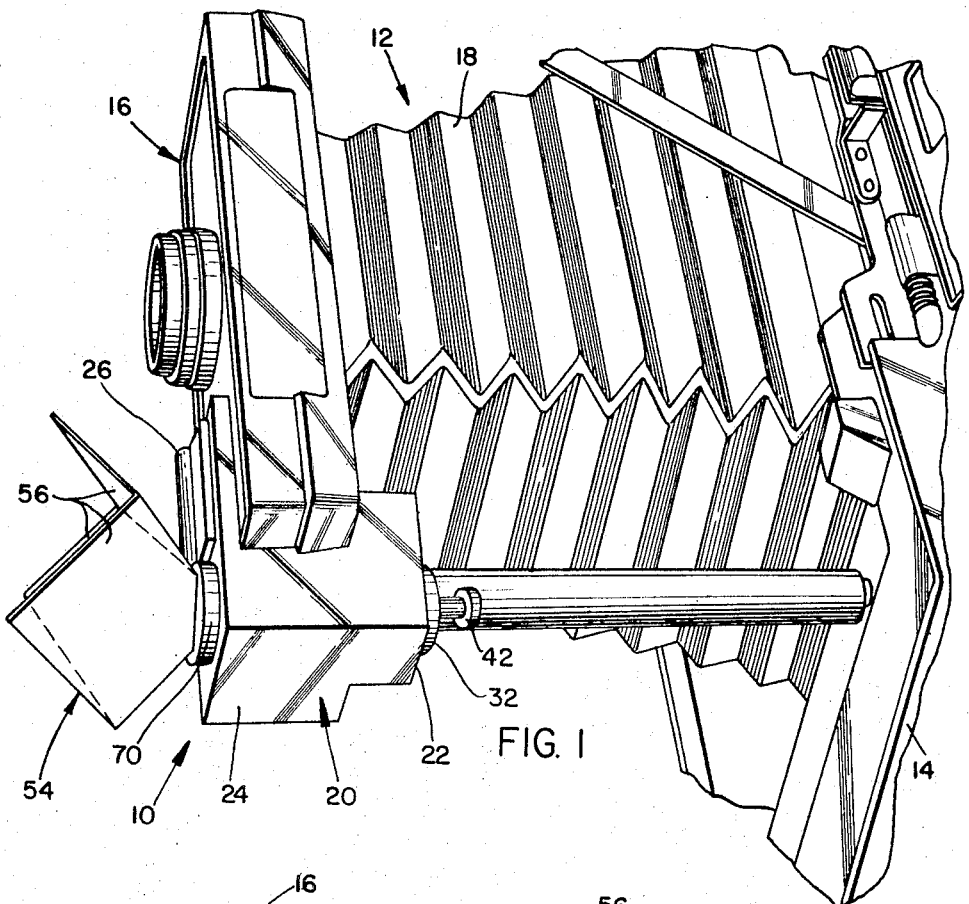
FIGURE 1 is a perspective view showing a photoflash gun constructed according to and useful in practicing the method of the invention shown operatively mounted on a camera.
Figure 2:
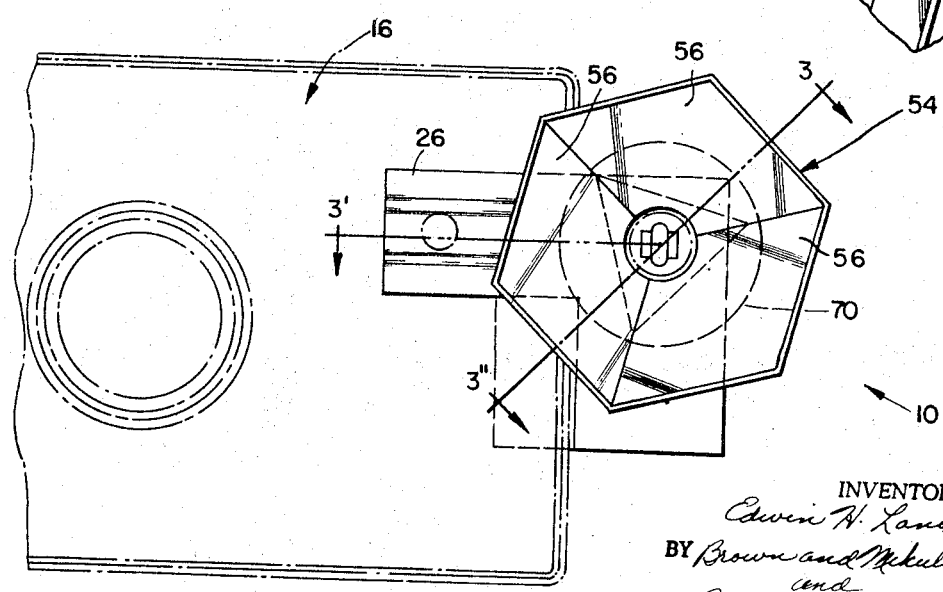
FIG. 2 is a front elevational view of the flash gun with the camera and shutter shown in broken lines.
Figure 3:
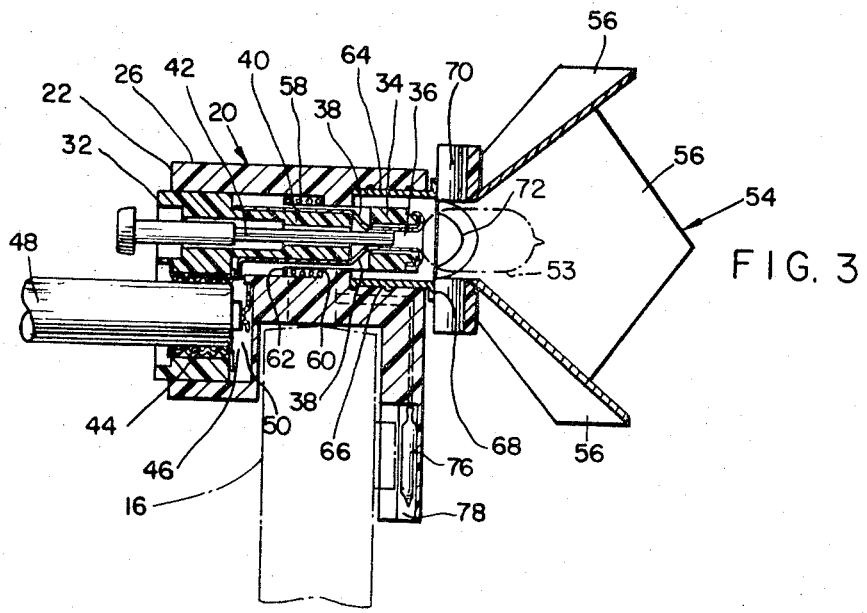
FIG. 3 is a combined sectional view of the flash gun taken substantially along the lines 3′–3 and 3″–3 of FIG. 2.
Figure 4:
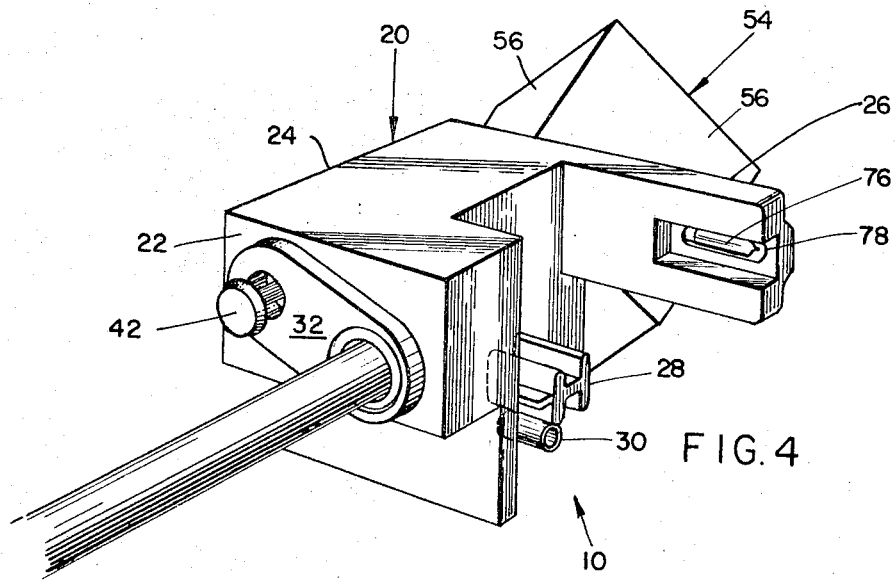
FIG. 4 is a rear perspective view of the flash gun.

Conventional photographic flash lamps used in photography and in the flash apparatus and method of the invention are useful only once and generally comprise a glass envelope containing a material which burns to produce a light pulse of predetermined brightness and duration and a conductive ignition element or filament for raising the flash producing material to its ignition temperature; and a base of some type including conductors for connecting the ignition element to a source of electric current. The ignition element is a relatively low resistance conductor which heats up and is consumed quite rapidly when current is passed therethrough. Each particular type of flash lamp is designed to produce a light pulse or flash having a predetermined intensity-time characteristic which is substantially the same for all lamps of that type and cannot be varied. Thus, in order to take pictures at varying camera-to-subject distances with a flash lamp mounted on the camera, it is necessary to vary either the exposure (i.e., duration and/or relative aperture) to compensate for changes in subject illumination; or to maintain subject illumination constant at every distance by varying the light output of the flash apparatus.

Shutters of the type employed with the apparatus and in the method of the invention are generally characterized by very rapid—almost instantaneous—opening and closing at the beginning and end, respectively, of each exposure and include an integrating circuit comprising a photoresponsive resistor and capacitor having a very rapid response such that it is possible to measure the light from a subject illuminated by a flash lamp and terminate the exposure before the flash or light pulse is terminated. Open flash exposures are very easily obtained with this type of shutter by shielding the photoresponsive resistor to prevent illumination thereof by light from the subject so that the shutter remains open and exposure is prolonged until the charge on the capacitor, which is a measure of the time integral of light incident on the photoresponsive resistor, reaches a predetermined value. The shutter will, of course, remain open and exposure will continue for as long as the photoresponsive resistor is shielded against incident light of a minimum intensity; so that to produce open flash photographs without extending exposures for prolonged intervals after the flash, provision must be made for causing the charge on the integrating capacitor to reach the value at which the shutter is closed, at the end of a predetermined interval preferably commencing with initiation of the flash. This latter feature is important because it insures good open flash exposures and prevents a second exposure by ambient light despite variations or delays in the time required for flash lamp ignition.

Reference is now made to FIGS. 1 through 4 of the drawings wherein there is shown flash apparatus in the form of a flash gun 10 embodying the invention and for practicing the method thereof. Flash gun 10 is adapted to be mounted on and coupled with a camera 12 of the type comprising a main body section 14 in which the photographic film is supported during exposure, and a section comprising a lens and shutter assembly 16 movable relative to body 14 for focusing the lens in accordance with the camera-to-subject distance. The distance between body 14 and lens and shutter assembly 16 is, of course, inversely proportional to the camera-to-subject distance and the camera includes the necessary means such as a bellows 18 for coupling the lens and shutter assembly to the main body and an erecting system or linkage for supporting and moving the lens and shutter assembly relative to the main body section as required. The flash gun shown is specially designed for use with the self-developing camera of the type mentioned heretofore and with a shutter of the type shown and described in the aforementioned applications.

Flash gun 10 comprises a housing 20 for mounting and enclosing components of the flash gun and coupling the flash gun with the lens and shutter assembly of the camera. Housing 20 may be of a generally rectangular configuration and includes a rear section 22, a side section 24 and a forward or cover section 26 cooperating to define a channel in which a portion of assembly 16 is engaged with cover section 26 extending across a portion of the front of assembly 16 and covering the photoresponsive resistor of the shutter shielding the resistor against illumination by light from the subject, and rear section 22 disposed behind a portion of shutter assembly 16 so that the shutter assembly is gripped between the rear and forward sections preventing relative movement of the shutter assembly and housing 20 of the flash gun. The shutter includes an outlet or jack in a side wall thereof for receiving a plug including two projections 28 and 30 extending from side section 24 of the flash gun and adapted to enter the jack in the shutter assembly in order to couple the electrical circuit of the flash gun, including a flash lamp, to the synchronizing flash contacts of the shutter mechanism. The projections 28 and 30 are similar to those described in the copending aforementioned application, Ser. No. 268,998, and adapted to retain the flash gun in operatively coupled relation on the shutter assembly as well as changing a functional relation between subject brightness and a corresponding electrical property of the photoresponsive resistor of the integrating circuit controlling duration of the exposure interval.

Mounted within rear section 22 and side section 24 of the flash gun housing is a support member 32 on which is mounted a flash lamp holder and means including a battery for moving support member 32 relative to the flash lamp housing and the lens and shutter assembly. The flash lamp holder includes an axially recessed and slotted socket member 34 formed with a socket 36 shaped to receive the base of a photoflash lamp, and two electrically conducting strips secured in axial recesses in the outside of socket member 34 and extending into and axially within socket 36 to make electrical contact with the contacts of a flash lamp. The lamp holder shown in the drawings is designed to be used with AG-1 type flash lamps having a relatively short narrow glass base with two wires protruding therefrom and an elongated and generally cylindrical envelope containing the flash-producing material. The material comprising socket member 34 as well as that comprising support member 32, of which the socket member may be an integral portion, is non-conductive and preferably an organic plastic adapted to formation by conventional casting or molding processes; and conducting strips 38 are preferably formed of metal and include U-shaped ends which extend beyond the forward open end of socket 36 and are engaged in recesses in the end of the socket member adjacent the socket. Support member 32 and socket member 34 are formed with an axial bore 40 in which a manually engageable rod 42 is disposed extending into recess 36 for ejecting a flash lamp from the socket.

As a means for powering the flash lamp and also positioning the flash lamp with respect to main body section 14 of the camera, a conductive (metal) threaded shell or socket 44 is mounted in a recess 46 in the rear of flash gun housing 20 for receiving the threaded end of a tube 48 which may either constitute the outer casing of a battery or may contain a battery for firing a flash lamp mounted in socket 36. Socket 44 is connected directly to one of conducting strips 38, and a conductive contact 50 is provided in recess 46 for making the second electrical contact with the battery and is electrically coupled with the other conducting strip 38.

Uniform distribution of light from a flash lamp 52 mounted in socket 36 is obtained with a reflector 54 in the form of half of a hollow cube comprising three planar reflecting surfaces each disposed perpendicularly to the other two and intersecting the other two at three straight lines, the reflecting surfaces being disposed at 45° with respect to the axis of the flash socket and/or lamp mounted therein. The reflecting surfaces, in the form shown, comprise the inner or concave surfaces of three panels 56 which may be rectangular in shape and formed of a relatively thin sheet material. An opening is provided in the reflector at the apex of the panels and lines of intersection through which flash lamp 52 mounted in socket 36 extends from the outside or convex side of the reflector to the inside or concave side of the reflector. Uniform illumination is obtained when the geometric center or axis of the flash lamp, regardless of its shape, is on or coincident with a line, called axis of the reflector, which intersects the lines of intersection of the reflecting surfaces and is disposed at a 45° angle with respect to the reflecting surfaces.

The flash lamp shown is designed so that the distribution and direction of light from the flash lamp reflected by the reflector in the direction of the subject being photographed is kept constant and only the quantum of light reflected toward the subject is varied in accordance with the camera-to-subject distance. Variation in the light output of the flash gun or light reflected by the reflector is achieved by moving the lamp relative to the reflector along the axis of the lamp and reflector, so that the amount of light directed toward the subject by the reflector is dependent upon the position of the lamp within the reflector and proportional to the amount of the lamp disposed between or in front of the concave side of the reflector in position to illuminate the reflecting surfaces. The advantage of this system lies in the fact that light distribution remains the same as long as the light originates effectively from the axis of the reflector and only the amount of light from the lamp and reflected by the reflector is changed by altering the size of the portion of the lamp seen by the reflector.

The amount of light directed by the reflector toward the subject is varied in direct relation to the distance between the camera and subject so that illumination of the subject remains substantially constant. To accomplish this, the lamp is held stationary with respect to the main body section of the camera while the reflector is moved with the lens and shutter assembly as the position of the latter is altered to focus the lens. For this purpose, support member 32 is mounted within housing 20 for movement forwardly and backwardly along the axis of the reflector and flash lamp socket and is biased rearwardly toward the main body section of the camera by a coil spring 58 engaged around socket member 34 between a shoulder 60 on housing 20 and a shoulder 62 on socket member 34. Support member 32 is retained against movement relative to the main body section 14 by battery tube 48 which extends rearwardly into engagement with the main body section of the camera. By virtue of this arrangement, the position of the flash lamp 52 mounted in socket 36 remains stationary with respect to the main body section of the camera as reflector 54 which is mounted on housing 20 moves together with the lens and shutter assembly to which the flash gun is attached.

The flash gun includes means for mounting the reflector and adjusting the position of the reflector with respect to the flash lamp socket to compensate for a particular film speed and/or a particular flash lamp. These means comprise a threaded socket 64 having an axis coincident with the reflector axis for receiving a cylindrical threaded sleeve 66 including a flange 68 on which is mounted a circular supporting ring 70 to which reflector 54 is secured. Sleeve 66 includes threads on its outer periphery for engaging the threads in socket 64 and may be rotated to displace the reflector axially with respect to housing 20 on which the reflector is mounted. In this manner the axial position of the reflector may be varied with respect to the lamp and the lens and shutter assembly on which housing 20 is mounted, in order to provide for a predetermined illumination level of the subject at any particular distance; and this illumination level may be selected to be proper for the sensitivity of the photographic film employed in the camera and/or the particular type of flash lamp used.

Panels 56 comprising the reflector and supporting ring 70 are provided with hemispherical openings 72, preferably three in number, communicating between the inside and outside of the reflector for permitting the escape of heat generated by the flash lamp together with any vapors of the lacquer coating usually provided on the lamp envelopes to prevent shattering thereof and/or modifying the optical (color) characteristics of the light from the lamp. Openings 72, in permitting escape of heat and vapors, function to prevent damage to the lamp socket and reflector due to heat and/or condensation of the vapors of any coating material on the outside of the lamp envelope.

Figure 5:
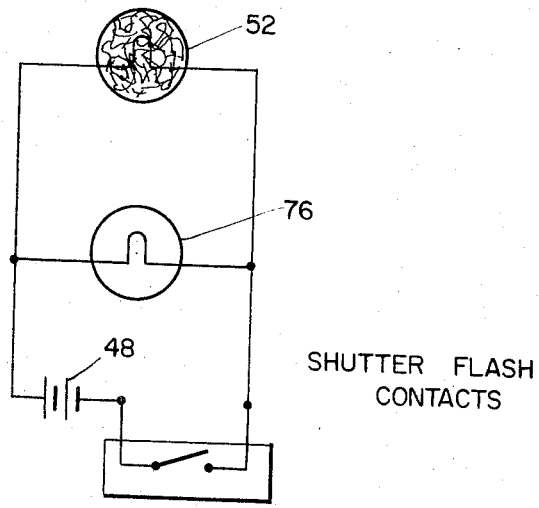
FIG. 5 is a circuit diagram of the flash apparatus employed in the method of the invention.

As previously noted, provision is made for illuminating the photo-responsive resistor of the shutter in order to terminate exposures or close the shutter after a predetermined interval following flash ignition. These means include a lamp 76, preferably of the incandescent type, mounted in a recess 78 in cover section 26 in position to illuminate the photoresponsive resistor of a shutter when the flash gun is operatively coupled with the shutter. Lamp 76 is coupled with battery 48, i.e., socket 44 and contact 50, by wire leads, through the flash contacts in the shutter in parallel with the flash lamp as shown in the circuit diagram comprising FIG. 5. The exposure interval during which the shutter is open is a function of the integrating circuit of the shutter and the time-light characteristic of lamp 76 and the latter may be varied so as to close the shutter at the end of any predetermined interval. The relationships between shutter operation, i.e., time-opening and the time-light characteristics of the flash and incandescent lamps are illustrated in the graph comprising FIG. 6 of the drawings. It will be noted from the curve representing shutter operation that the shutter opens fully in a very short time, e.g., of the order of 4 microseconds, and closes equally rapidly. The flash contacts are closed at the same time the shutter is opened and light output from the lamp rises very slowly at first then very rapidly to a peak thereafter falling off rapidly to an insignificant level. If ignition of the combustible flash producing material is delayed, the time-light curve for the flash lamp remains substantially the same for all practical purposes and is merely shifted.

Figure 6:
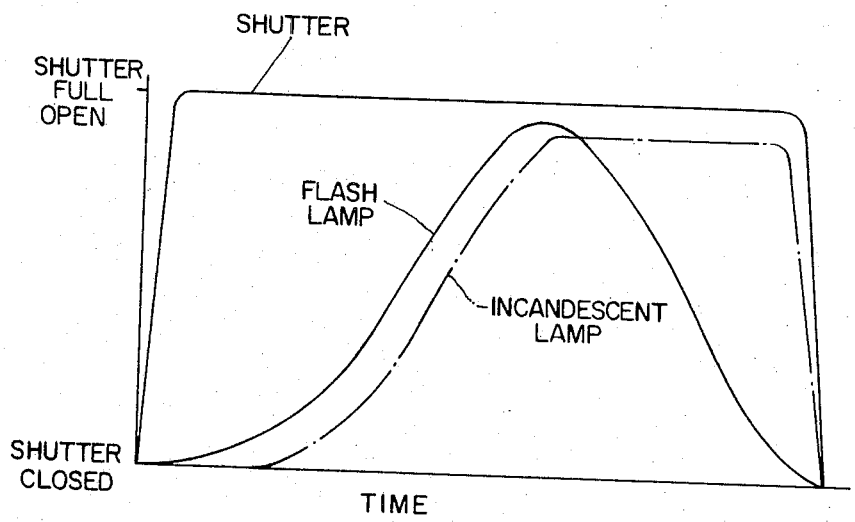
FIG. 6 is a graph illustrating time-opening and time-intensity relationships for the shutter, flash lamp and another lamp, as required in the method of the invention.

In open flash photography, it is desirable to keep the shutter open throughout the duration of the flash so that the exposure interval is determined by the flash lamp rather than by the shutter. The open shutter interval is in turn determined by the time-light characteristic of the incandescent lamp in the flash gun and to insure that this interval commences at least contemporaneously with ignition of the flash lamp. To insure that a delay in flash ignition will not result in premature termination of exposure by the shutter, the incandenscent lamp is connected in parallel with the flash lamp and is selected to have a resistance which is greater than the initial resistance of the filament of the flash lamp. The time-light characteristic of the incandescent lamp may be selected to provide for closure of the shutter and termination of exposure at the end of any predetermined interval and, as shown in FIG. 6, to close the shutter at the end of the exposure produced by the flash lamp. The particular incandescent lamp illustrated by FIG. 6 has a time-light curve which parallels the rising portion of the flash lamp curve so that commencement of timing of the open shutter interval follows, by a predetermined short delay, ignition of the flash lamp, insuring against premature shutter closing. The shutter, it will be noted, includes contacts in circuit with the incandescent lamp for opening the circuit to the incandescent lamp when exposure is terminated. It is possible, if desired, with the construction described to close the shutter at the end of different intervals, for example, during the period of the flash, and this is easily accomplished by selecting an incandescent lamp having a different time-light characteristic, for example, a lamp which rises to a higher peak intensity more rapidly than the lamp illustrated.

It will be seen from the foregoing that the invention accomplishes its objects by providing a relatively simple and inexpensive flash gun construction and method of flash photography which now makes it possible to make open flash exposures with a fully automatic shutter of the type normally capable of terminating a flash exposure during the flash interval.

Since certain changes may be made in the above process and apparatus without departing from the scope of the invention herein involved, it is intended that all matter contained in the above description or shown in the accompanying drawings shall be interpreted as illustrative and not in a limiting sense.

What is claimed is:
1. Photographic flash apparatus for permitting open flash exposures with a shutter mechanism including photoresponsive means normally illuminated by light from the subject being photographed for automatically establishing the proper exposure interval for said shutter in accordance with the light from said subject incident on said photoresponsive means, said flash apparatus comprising, in combination:
  means for covering and completely shielding said photoresponsive means of a shutter from light from the subject being photographed when said flash apparatus is operatively coupled with said shutter;
  illumination means for illuminating said photoresponsive means with a predetermined amount of light during a flash exposure to effect a predetermined response of said photoresponsive means and thereby automatically establish a predetermined exposure interval for said shutter, the length of said exposure interval being established by said illumination means independently of the flash lamp employed during said exposure interval; and
  means for firing a flash lamp following initiation of said exposure interval and, a predetermined time after firing of said flash lamp, energizing said illumination means for terminating said exposure interval.
2. Photographic flash apparatus as defined in claim 1 wherein said illumination means for illuminating said photoresponsive means include an incandescent lamp and the last-mentioned means include a source of electrical current and means for electrically coupling said source with a flash lamp and said incandescent lamp.

3. Photographic flash apparatus as defined in claim 2 wherein said last-mentioned means include electrical contacts for coupling a flash lamp to said source and means for coupling said incandescent lamp to said source in parallel with said flash lamp; and said incandescent lamp has a higher electrical resistance than the initial resistance of said flash lamp so as to be energized and reach a maximum brightness at the end of a predetermined interval following ignition of said flash lamp.

4. Photographic flash apparatus for permitting open flash exposures with a shutter mechanism including means for making exposures of a duration dependent upon the rate of change of a charge on a capacitor, a photoresponsive resistor normally illuminated by light from the subject being photographed for determining said rate of change, and switch means for closing an electrical circuit at the beginning of an exposure, said apparatus comprising, in combination:

a holder for a flash lamp including electrical contacts therefor;

a source of electric current;

electrical connector means for coupling said electrical contacts to said source of electric current through said contact means when said flash apparatus is operatively coupled with said shutter mechanism;

cover means for shielding said photoresponsive resistor from light from the subject being photographed when said flash apparatus is operatively coupled with said shutter mechanism; and an incandescent lamp connected in parallel with said electrical contacts and mounted in said cover means for illuminating said photoresponsive resistor following closure of said switch means to determine the exposure interval for said shutter independently of light from said flash lamp;

said incandescent lamp having a higher electrical resistance than the resistance of a flash lamp mounted in said holder so as to be energized and reach a maximum brightness at the end of a predetermined interval following ignition of said flash lamp.

5. Photographic flash apparatus for use with a shutter mechanism including means for making exposures of a duration dependent upon the rate of change of a charge on a capacitor, a photoresponsive resistor normally illuminated by light from the subject being photographed for determining said rate of change, and switch means for closing an electrical circuit at the beginning of an exposure, said apparatus comprising, in combination:

a holder for a flash lamp including electrical contacts therefor;

electrical connector means for coupling said electrical contacts to a source of electric current through said switch means when said flash apparatus is operatively coupled with said shutter mechanism;

cover means for shielding said photoresponsive resistor from the subject being photographed when said flash apparatus is operatively coupled with said shutter mechanism;

a lamp connected in parallel with said electrical contacts and mounted in said cover means for illuminating said photoresponsive resistor following closure of said switch means; and said lamp having a higher resistance than the initial resistance of flash lamps with which said apparatus is designed to be employed and a brightness-time characteristic such that light incident on said photoresponsive resistor from said lamp results in termination of exposure at the end of a predetermined time period commencing with ignition of said flash lamp.

6. Photographic flash apparatus as defined in claim 5 wherein the brightness-time characteristic of said lamp is such that exposure is terminated at approximately the end of the light pulse from said flash lamp.

7. The method of making open flash exposures with a shutter mechanism including a photoresponsive resistor normally illuminated by light from the subject being photographed and capable of automatically determining the exposure interval, said method comprising:

covering said photoresponsive resistor to prevent illumination thereof by light from the subject;

opening said shutter to initiate an exposure and closing a circuit to ignite a flash lamp; and illuminating said photoresponsive resistor by light from a controlled source to terminate said exposure at the end of an interval of predetermined duration commencing with ignition of said flash lamp.

8. The method of claim 7 wherein said controlled source of light for illuminating said photoresponsive resistor comprises an incandescent lamp which is energized immediately after ignition of said flash lamp.

9. The method of making flash exposures with a shutter including means for making exposures of a duration dependent upon the rate of change of a charge on a capacitor, in turn a function of the resistance of a photoresponsive resistor normally illuminated by light from the subject being photographed, said method comprising:

covering said photoresponsive resistor to prevent illumination thereof by light from the subject;

simultaneously opening said shutter to initiate an exposure and closing a circuit to ignite a flash lamp and energize an incandescent lamp after ignition of said flash lamp; and illuminating said photoresponsive resistor by light from said incandescent lamp to terminate said exposure at the end of a time period of predetermined duration commencing with ignition of said flash lamp.

10. The method of claim 9 wherein said incandescent lamp is energized immediately after ignition of said flash lamp.

11. The method of claim 10 wherein said flash lamp and said incandescent lamp are coupled in parallel with a source of current for igniting said flash lamp and energizing said incandescent lamp and the resistance of said incandescent lamp is greater than the initial resistance of said flash lamp.

12. The method of claim 9 wherein said incandescent lamp is energized after ignition of said flash lamp and brought to peak intensity at substantially the same rate as said flash lamp.

13. The method of claim 9 wherein said incandescent lamp is energized after ignition of said flash lamp and is brought to an intensity such that exposure is terminated at approximately the end of the light pulse from said flash lamp.

No references cited.

JOHN M. HORAN, *Primary Examiner.*